US010655856B2

United States Patent
Eastwood et al.

(10) Patent No.: US 10,655,856 B2
(45) Date of Patent: May 19, 2020

(54) DILUTION PASSAGE ARRANGEMENT FOR GAS TURBINE ENGINE COMBUSTOR

(71) Applicant: United Technologies Corporation, Farmington, CT (US)

(72) Inventors: Jonathan J. Eastwood, Vernon, CT (US); Dennis M. Moura, South Windsor, CT (US); Lee E. Bouldin, Woodbridge, CT (US); Monica Pacheco-Tougas, Waltham, MA (US)

(73) Assignee: Raytheon Technologies Corporation, Farmington, CT (US)

( * ) Notice: Subject to any disclaimer, the term of this patent is extended or adjusted under 35 U.S.C. 154(b) by 324 days.

(21) Appl. No.: 15/105,427

(22) PCT Filed: Dec. 19, 2014

(86) PCT No.: PCT/US2014/071615
§ 371 (c)(1),
(2) Date: Jun. 16, 2016

(87) PCT Pub. No.: WO2015/147932
PCT Pub. Date: Oct. 1, 2015

(65) Prior Publication Data
US 2016/0334103 A1 Nov. 17, 2016

Related U.S. Application Data

(60) Provisional application No. 61/918,418, filed on Dec. 19, 2013.

(51) Int. Cl.
*F23R 3/06* (2006.01)
*F23R 3/00* (2006.01)
*F23R 3/60* (2006.01)

(52) U.S. Cl.
CPC ............... *F23R 3/06* (2013.01); *F23R 3/002* (2013.01); *F23R 3/007* (2013.01); *F23R 3/60* (2013.01); *F23R 2900/00012* (2013.01); *F23R 2900/00017* (2013.01); *F23R 2900/03041* (2013.01); *Y02T 50/675* (2013.01)

(58) Field of Classification Search
CPC .. F23R 3/06; F23R 3/002; F23R 3/007; F23R 3/06; F23R 3/04; F23R 3/045; F23R 3/08; F23R 3/60
See application file for complete search history.

(56) References Cited

U.S. PATENT DOCUMENTS

| | | | | |
|---|---|---|---|---|
| 4,302,941 A | * | 12/1981 | DuBell | F23R 3/08 60/757 |
| 4,622,821 A | * | 11/1986 | Madden | F23R 3/06 60/755 |
| 4,653,279 A | * | 3/1987 | Reynolds | F23R 3/06 60/755 |
| 4,695,247 A | | 9/1987 | Enzaki et al. | |

(Continued)

OTHER PUBLICATIONS

EP search report for EP14887012.4 dated Nov. 18, 2016.

*Primary Examiner* — Craig Kim
(74) *Attorney, Agent, or Firm* — Getz Balich LLC

(57) ABSTRACT

A liner panel is provided for use in a combustor of a gas turbine engine. The liner panel includes a major dilution passage having a lip and a first seal boss. The liner panel also includes a minor dilution passage having a second seal boss adjacent the first seal boss.

18 Claims, 9 Drawing Sheets

(56) References Cited

U.S. PATENT DOCUMENTS

| | | | |
|---|---|---|---|
| 4,700,544 A * | 10/1987 | Fucci | F23R 3/045 60/757 |
| 5,127,229 A | 7/1992 | Ishibashi et al. | |
| 5,197,278 A | 3/1993 | Sabla et al. | |
| 5,199,265 A | 4/1993 | Borkowicz | |
| 5,201,181 A | 4/1993 | Ohmori et al. | |
| 5,211,005 A | 5/1993 | Hovnanian | |
| 5,289,685 A | 3/1994 | Hoffa | |
| 5,303,542 A | 4/1994 | Hoffa | |
| 5,325,660 A | 7/1994 | Taniguchi et al. | |
| 5,402,633 A | 4/1995 | Hu | |
| 5,660,044 A | 8/1997 | Bonciani et al. | |
| 5,687,572 A * | 11/1997 | Schrantz | F23R 3/007 431/352 |
| 5,699,667 A | 12/1997 | Joos | |
| 6,385,960 B1 | 5/2002 | Kress et al. | |
| 6,681,577 B2 * | 1/2004 | Bolender | F23R 3/002 60/754 |
| 7,093,439 B2 * | 8/2006 | Pacheco-Tougas | F23R 3/002 60/752 |
| 7,189,073 B2 | 3/2007 | Pennell et al. | |
| 8,047,008 B2 * | 11/2011 | Lebegue | F01D 9/023 60/752 |
| 8,056,342 B2 * | 11/2011 | Shelley | F23R 3/06 60/752 |
| 8,220,269 B2 | 7/2012 | Poyyapakkam | |
| 8,220,271 B2 | 7/2012 | Poyyapakkam et al. | |
| 8,407,892 B2 | 4/2013 | DiCintio et al. | |
| 8,448,443 B2 * | 5/2013 | Berry | F23R 3/045 60/754 |
| 9,010,121 B2 * | 4/2015 | Taylor | F23R 3/002 60/752 |
| 9,038,395 B2 * | 5/2015 | Rudrapatna | F23R 3/06 60/754 |
| 9,416,970 B2 * | 8/2016 | Kirsopp | F23R 3/002 |
| 9,765,969 B2 * | 9/2017 | Graves | F23R 3/06 |
| 2002/0116929 A1 * | 8/2002 | Snyder | F23R 3/002 60/740 |
| 2003/0213250 A1 * | 11/2003 | Pacheco-Tougas | F23R 3/002 60/752 |
| 2011/0048024 A1 | 3/2011 | Snyder et al. | |
| 2013/0031783 A1 * | 2/2013 | DiCintio | F23R 3/06 29/890.02 |
| 2013/0255265 A1 | 10/2013 | Rudrapatna et al. | |
| 2015/0323182 A1 * | 11/2015 | Sandoval | F23R 3/02 60/752 |
| 2017/0059162 A1 * | 3/2017 | Papple | F23R 3/16 |
| 2018/0298819 A1 * | 10/2018 | Moura | F02C 7/12 |

* cited by examiner

DILUTION PASSAGE ARRANGEMENT FOR GAS TURBINE ENGINE COMBUSTOR

CROSS-REFERENCE TO RELATED APPLICATION

This application claims priority to PCT Patent Application No. PCT/US14/071615 filed Dec. 19, 2014 which claims priority to U.S. Patent Application No. 61/918,418 filed Dec. 19, 2013, which are hereby incorporated herein by reference in their entireties.

BACKGROUND

The present disclosure relates to a gas turbine engine and, more particularly, to a combustor section therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Among the engine components, relatively high temperatures are observed in the combustor section such that cooling airflow is provided to meet desired service life requirements. The combustor section typically includes a combustion chamber formed by an inner and outer wall assembly. Each wall assembly includes a support shell lined with heat shields often referred to as liner panels.

In certain combustion architectures, dilution passages direct airflow to condition air within the combustion chamber. Historically, there have been two types of circular dilution passages. One type has an extension to the dilution passage that protrudes thru the combustor shell by about 0.005-0.030" depending on tolerances which may require a larger hole in the combustor shell. Another type does not have an extension that protrudes thru the combustor shell but may reduce dilution flow efficiency therethrough.

SUMMARY

A liner panel for use in a combustor of a gas turbine engine, according to one disclosed non-limiting embodiment of the present disclosure, includes a major dilution passage having a lip and a first seal boss. A minor dilution passage is also included having a second seal boss adjacent the first seal boss.

In a further embodiment of the present disclosure, the lip is configured to extend above a support shell when the liner panel is mounted thereto.

In a further embodiment of any of the foregoing embodiments of the present disclosure, the first seal boss is connected with the second seal boss.

In a further embodiment of any of the foregoing embodiments of the present disclosure, the first seal boss defines an inner diameter outside the lip of about 0.64" (16.3 mm).

In a further embodiment of any of the foregoing embodiments of the present disclosure, the first seal boss defines an outer diameter of about 0.7" (17.8 mm).

In a further embodiment of any of the foregoing embodiments of the present disclosure, the second seal boss defines an inner diameter of about 0.2" (5.1 mm).

In a further embodiment of any of the foregoing embodiments of the present disclosure, the second seal boss defines an outer diameter of about 0.27" (6.9 mm).

In a further embodiment of any of the foregoing embodiments of the present disclosure, the first seal boss and the second seal boss are at least partially surrounded by a multiple of effusion passages.

A wall assembly for use in a combustor for a gas turbine engine, according to another disclosed non-limiting embodiment of the present disclosure, includes a support shell with at least one major aperture and at least one minor aperture. A liner panel is included and mounted to the support shell. The liner panel includes a major dilution passage and a minor dilution passage. The major dilution passage has a lip that extends at least partially through the major aperture and a first seal boss that seals around the major aperture. The minor dilution passage has a second seal boss that seals around the minor aperture.

In a further embodiment of any of the foregoing embodiments of the present disclosure, the first seal boss flows into the second seal boss.

In a further embodiment of any of the foregoing embodiments of the present disclosure, the first seal boss defines an inner diameter outside the lip of about 0.64" (16.3 mm).

In a further embodiment of any of the foregoing embodiments of the present disclosure, the first seal boss defines an outer diameter of about 0.7" (17.8 mm).

In a further embodiment of any of the foregoing embodiments of the present disclosure, the second seal boss defines an inner diameter of about 0.2" (5.1 mm).

In a further embodiment of any of the foregoing embodiments of the present disclosure, the second seal boss defines an outer diameter of about 0.27" (6.9 mm).

In a further embodiment of any of the foregoing embodiments of the present disclosure, the first seal boss and the second seal boss are at least partially surrounded by a multiple of effusion passages.

A method of directing airflow through a wall assembly within a combustor of a gas turbine engine, according to another disclosed non-limiting embodiment of the present disclosure, includes at least partially sealing a liner panel to a support shell. The liner panel includes a major dilution passage and a minor dilution passage. The major dilution passage has a lip extending at least partially through a major aperture in the support shell and a first seal boss that seals with the support shell around the major aperture. The minor dilution passage has a second seal boss that seals with the support shell around the minor aperture.

In a further embodiment of any of the foregoing embodiments of the present disclosure, the method also includes providing a line to line interface between the minor dilution passage and the minor aperture in the support shell in response to a thermal excursion and mechanical tolerance.

In a further embodiment of any of the foregoing embodiments of the present disclosure, the method also includes at least partially surrounding the first seal boss and the second seal boss by a multiple of effusion passages.

In a further embodiment of any of the foregoing embodiments of the present disclosure, the method also includes integrally forming the major dilution passage and the minor dilution passage with the liner panel.

In a further embodiment of any of the foregoing embodiments of the present disclosure, the method also includes connecting the first seal boss and the second seal boss.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
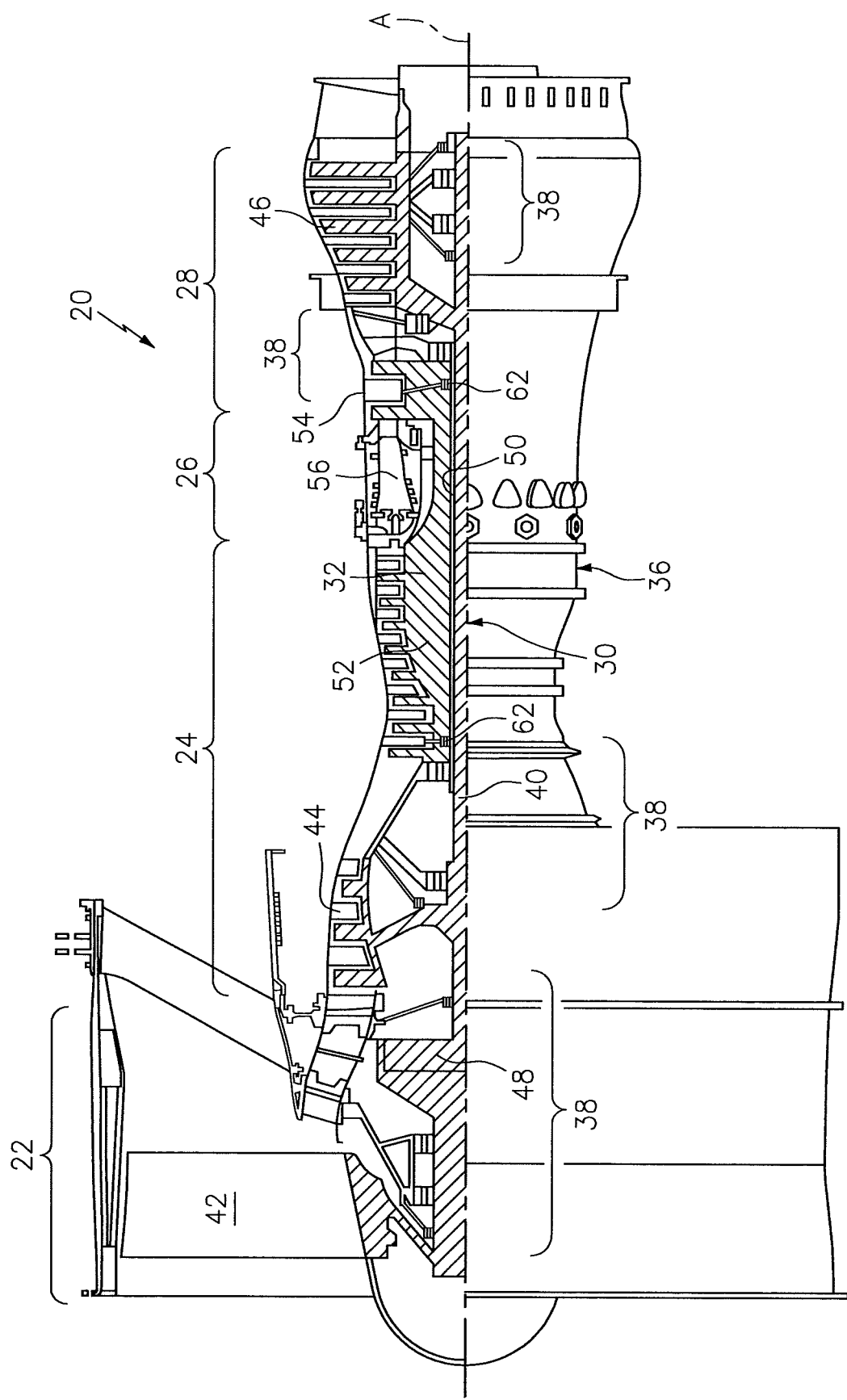
FIG. 1 is a schematic cross-section of an example gas turbine engine architecture.
Figure 2:
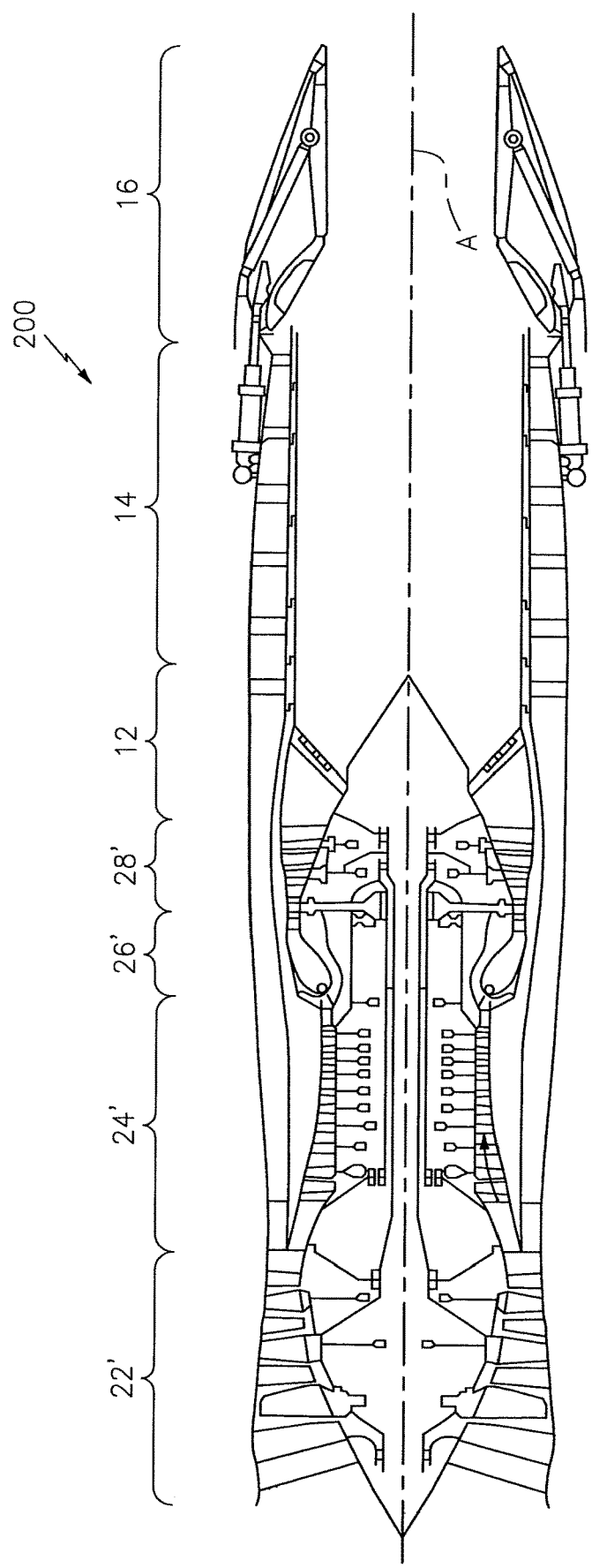
FIG. 2 is a schematic cross-section of another example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engine architectures 200 might include an augmentor section 12, an exhaust duct section 14 and a nozzle section 16 in addition to the fan section 22', compressor section 24', combustor section 26' and turbine section 28' (see FIG. 2) among other systems or features. Referring still to FIG. 1, the fan section 22 drives air along a bypass flowpath and into the compressor section 24. The compressor section 24 drives air along a core flowpath for compression and communication into the combustor section 26, which then expands and directs the air through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly or through a geared architecture 48 as shown in FIG. 1 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion. The main engine shafts 40, 50 are supported at a plurality of points by the bearing systems 38 within the static structure 36.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to one non-limiting embodiment of the example gas turbine engine 20 is less than about 1150 fps (351 m/s).

Figure 3:
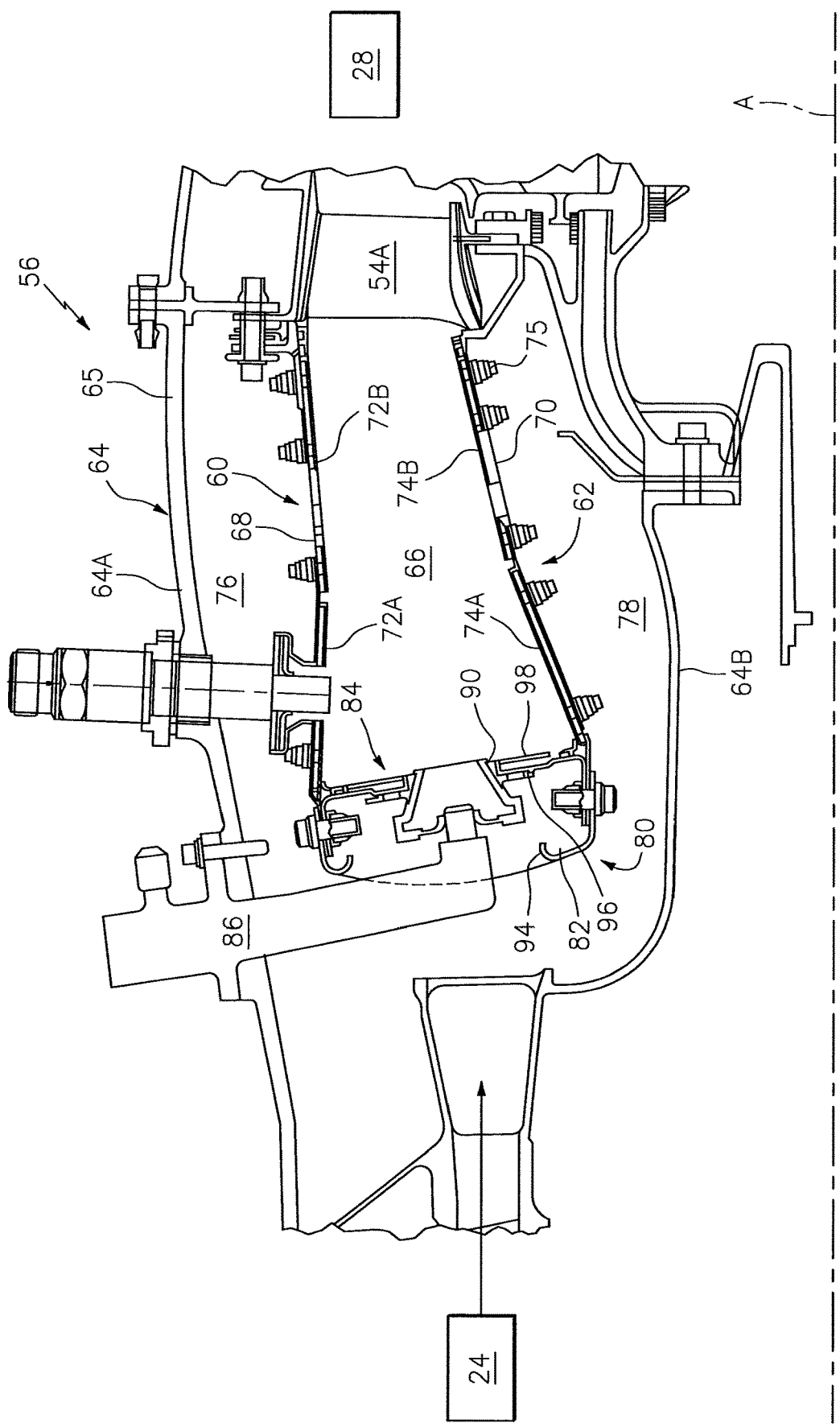
FIG. 3 is an expanded longitudinal schematic sectional view of a combustor section according to one non-limiting embodiment that may be used with the example gas turbine engine architectures shown in FIGS. 1 and 2.

With reference to FIG. 3, the combustor section 26 generally includes a combustor 56 with an outer combustor wall assembly 60, an inner combustor wall assembly 62 and a diffuser case module 64. The outer combustor wall assembly 60 and the inner combustor wall assembly 62 are spaced apart such that a combustion chamber 66 is defined therebetween. The combustion chamber 66 is generally annular in shape to surround the engine central longitudinal axis A.

The outer combustor liner assembly 60 is spaced radially inward from an outer diffuser case 64A of the diffuser case module 64 to define an outer annular plenum 76. The inner combustor liner assembly 62 is spaced radially outward from an inner diffuser case 64B of the diffuser case module 64 to define an inner annular plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

The combustor wall assemblies 60, 62 contain the combustion products for direction toward the turbine section 28. Each combustor wall assembly 60, 62 generally includes a respective support shell 68, 70 which supports one or more liner panels 72, 74 mounted thereto arranged to form a liner array. The support shells 68, 70 may be manufactured by, for example, the hydroforming of a sheet metal alloy to provide the generally cylindrical outer shell 68 and inner shell 70. Each of the liner panels 72, 74 may be generally rectilinear with a circumferential arc. The liner panels 72, 74 may be manufactured of, for example, a nickel based super alloy, ceramic or other temperature resistant material. In one disclosed non-limiting embodiment, the liner array includes a multiple of forward liner panels 72A and a multiple of aft liner panels 72B that are circumferentially staggered to line the outer shell 68. A multiple of forward liner panels 74A and a multiple of aft liner panels 74B are circumferentially staggered to line the inner shell 70.

The combustor 56 further includes a forward assembly 80 immediately downstream of the compressor section 24 to receive compressed airflow therefrom. The forward assembly 80 generally includes a cowl 82, a bulkhead assembly 84, and a multiple of swirlers 90 (one shown). Each of the swirlers 90 is circumferentially aligned with one of a multiple of fuel nozzles 86 (one shown) and the respective hood ports 94 to project through the bulkhead assembly 84.

The bulkhead assembly 84 includes a bulkhead support shell 96 secured to the combustor walls 60, 62, and a multiple of circumferentially distributed bulkhead liner panels 98 secured to the bulkhead support shell 96 around the swirler opening. The bulkhead support shell 96 is generally annular and the multiple of circumferentially distributed bulkhead liner panels 98 are segmented, typically one to each fuel nozzle 86 and swirler 90.

The cowl 82 extends radially between, and is secured to, the forwardmost ends of the combustor walls 60, 62. The cowl 82 includes a multiple of circumferentially distributed hood ports 94 that receive one of the respective multiple of fuel nozzles 86 and facilitates the direction of compressed air into the forward end of the combustion chamber 66 through a swirler opening 92. Each fuel nozzle 86 may be secured to the diffuser case module 64 and project through one of the hood ports 94 and through the swirler opening 92 within the respective swirler 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 4:
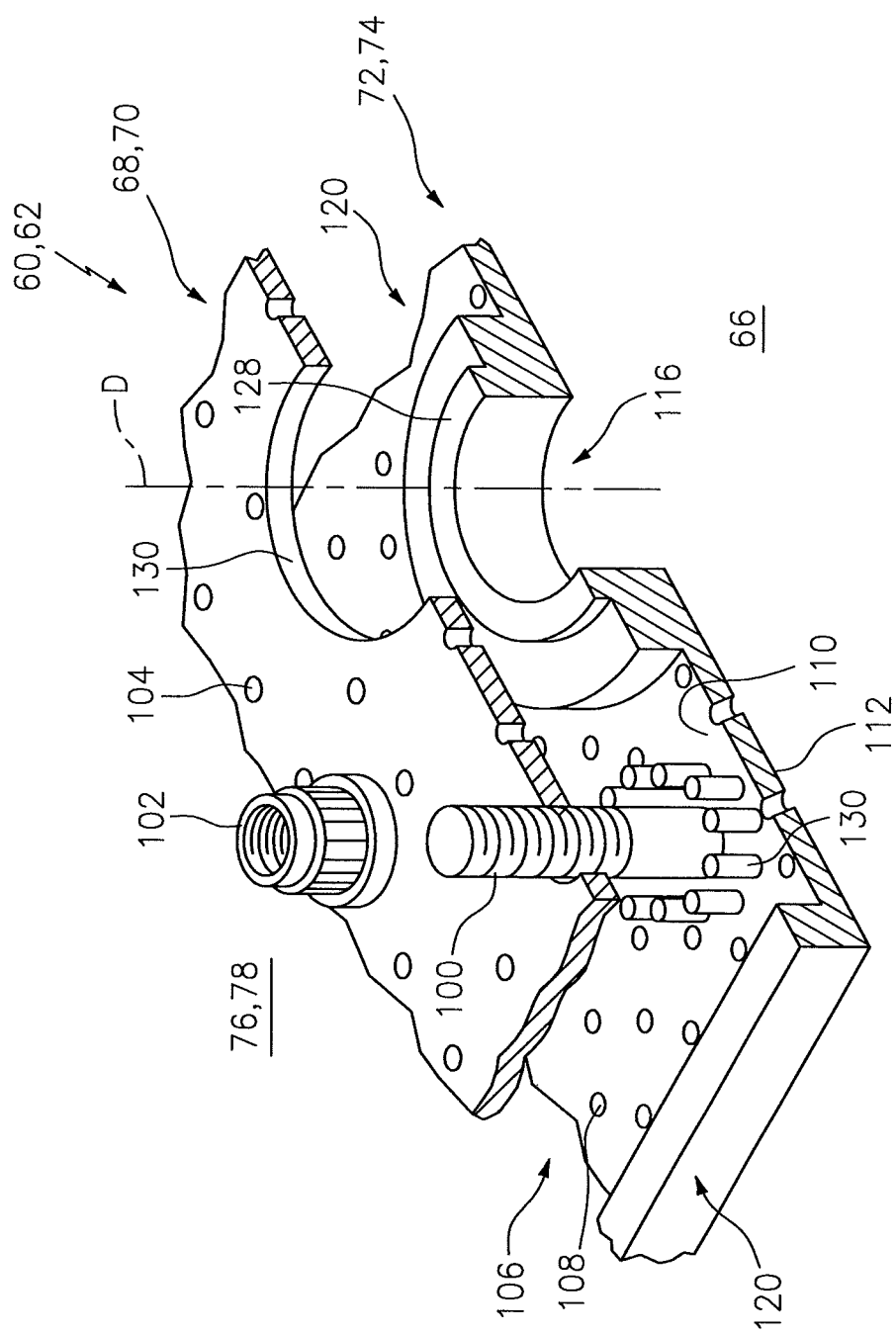
FIG. 4 is an exploded partial sectional view of a portion of a combustor wall assembly.

With reference to FIG. 4, a multiple of studs 100 extend from each of the liner panels 72, 74 so as to permit an array (partially shown in FIG. 5) of the liner panels 72, 74 to be mounted to their respective support shells 68, 70 with fasteners 102 such as nuts. That is, the studs 100 project rigidly from the liner panels 72, 74 to extend through the respective support shells 68, 70 and receive the fasteners 102 on a threaded section thereof.

A multiple of cooling impingement passages 104 penetrate through the support shells 68, 70 to allow air from the respective annular plenums 76, 78 to enter cavities 106 formed in the combustor walls 60, 62 between the respective support shells 68, 70 and liner panels 72, 74. The cooling impingement passages 104 are generally normal to the surface of the liner panels 72, 74. The air in the cavities 106 provide cold side impingement cooling of the liner panels 72, 74 that is generally defined herein as heat removal via internal convection.

A multiple of effusion passages 108 penetrate through each of the liner panels 72, 74. The geometry of the passages (e.g., diameter, shape, density, surface angle, incidence angle, etc.) as well as the location of the passages with respect to the high temperature combustion flow also contributes to effusion film cooling. The effusion passages 108 allow the air to pass from the cavities 106 defined in part by a cold side 110 of the liner panels 72, 74 to a hot side 112 of the liner panels 72, 74 and thereby facilitate the formation of a thin, relatively cool, film of cooling air along the hot side 112. In one disclosed non-limiting embodiment, each of the multiple of effusion passages 108 are typically 0.025" (0.635 mm) in diameter and define a surface angle of about thirty (30) degrees with respect to the cold side 110 of the liner panels 72, 74. The effusion passages 108 are generally more numerous than the impingement passages 104 and promote film cooling along the hot side 112 to sheath the liner panels 72, 74. Film cooling as defined herein is the introduction of a relatively cooler air at one or more discrete locations along a surface exposed to a high temperature environment to protect that surface in the region of the air injection as well as downstream thereof. The combination of impingement passages 104 and effusion passages 108 may be referred to as an Impingement Film Floatwall (IFF) assembly.

A multiple of dilution passages 116 are located in the liner panels 72, 74 each along a common axis D. For example only, the dilution passages 116 are located in a circumferential line W (shown partially in FIG. 5). Although the dilution passages 116 are illustrated in the disclosed non-limiting embodiment as within the aft liner panels 72B, 74B, the dilution passages may alternatively be located in the forward liner panels 72A, 72B or in a single liner panel which replaces the fore/aft liner panel array. Further, the dilution passages 116 although illustrated in the disclosed non-limiting embodiment as integrally formed in the liner panels, it should be appreciated that the dilution passages 116 may be separate components. Whether integrally formed or separate components, the dilution passages 116 may be referred to as grommets.

Figure 5:
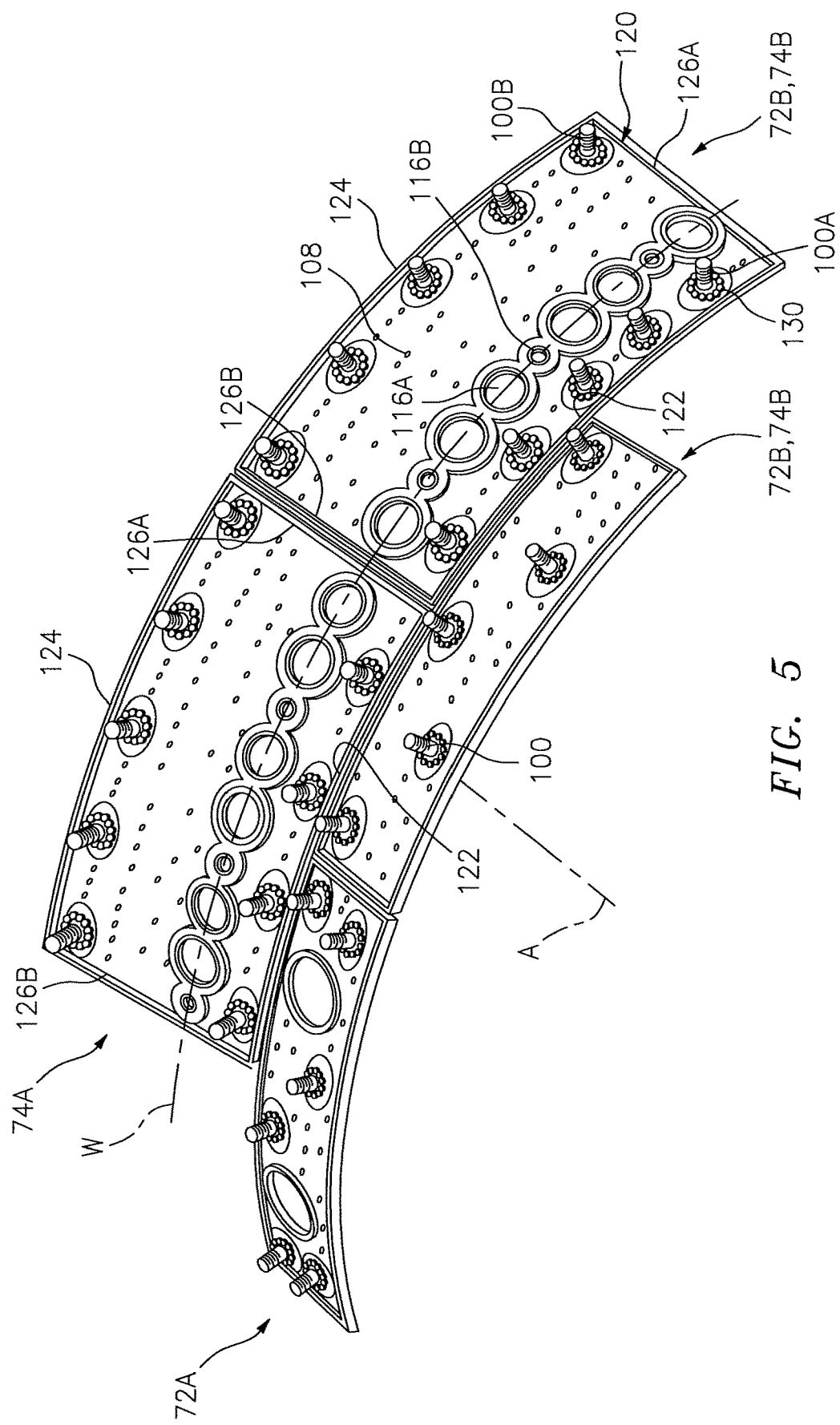
FIG. 5 is a perspective cold side view of a portion of a liner panel array.

With reference to FIG. 5, in one disclosed non-limiting embodiment, each of the aft liner panels 72B, 74B in the liner panel array includes a perimeter rail 120 formed by a forward circumferential rail 122, an aft circumferential rail 124 and axial rails 126A, 126B that interconnect the forward and aft circumferential rail 122, 124. The perimeter rail 120 seals each liner panel 72B, 74B with respect to the support shell 68, 70 to form the impingement cavity 106 therebetween (see FIG. 4). That is, the forward and aft circumferential rail 122, 124 are located at relatively constant curvature shell interfaces while the axial rails 126 extend across an axial length of the respective support shell 68, 70 to complete the perimeter rail 120 that seals the liner panels 72B, 74B to the respective support shell 68, 70.

A row of studs 100A, 100B are located adjacent to the respective forward circumferential rail 122 and aft circumferential rail 124. Each of the studs 100A, 100B may be at least partially surrounded by posts 130 to at least partially support the fastener 102 and provide a stand-off between each liner panels 72B, 74B and respective support shell 68, 70.

The dilution passages 116 are located downstream of the forward circumferential rail 122 to quench the hot combustion gases within the combustion chamber 66 by direct supply of cooling air from the respective annular plenums 76, 78. That is, the dilution passages 116 pass air at the pressure outside the combustion chamber 66 directly into the combustion chamber 66.

Figure 6:
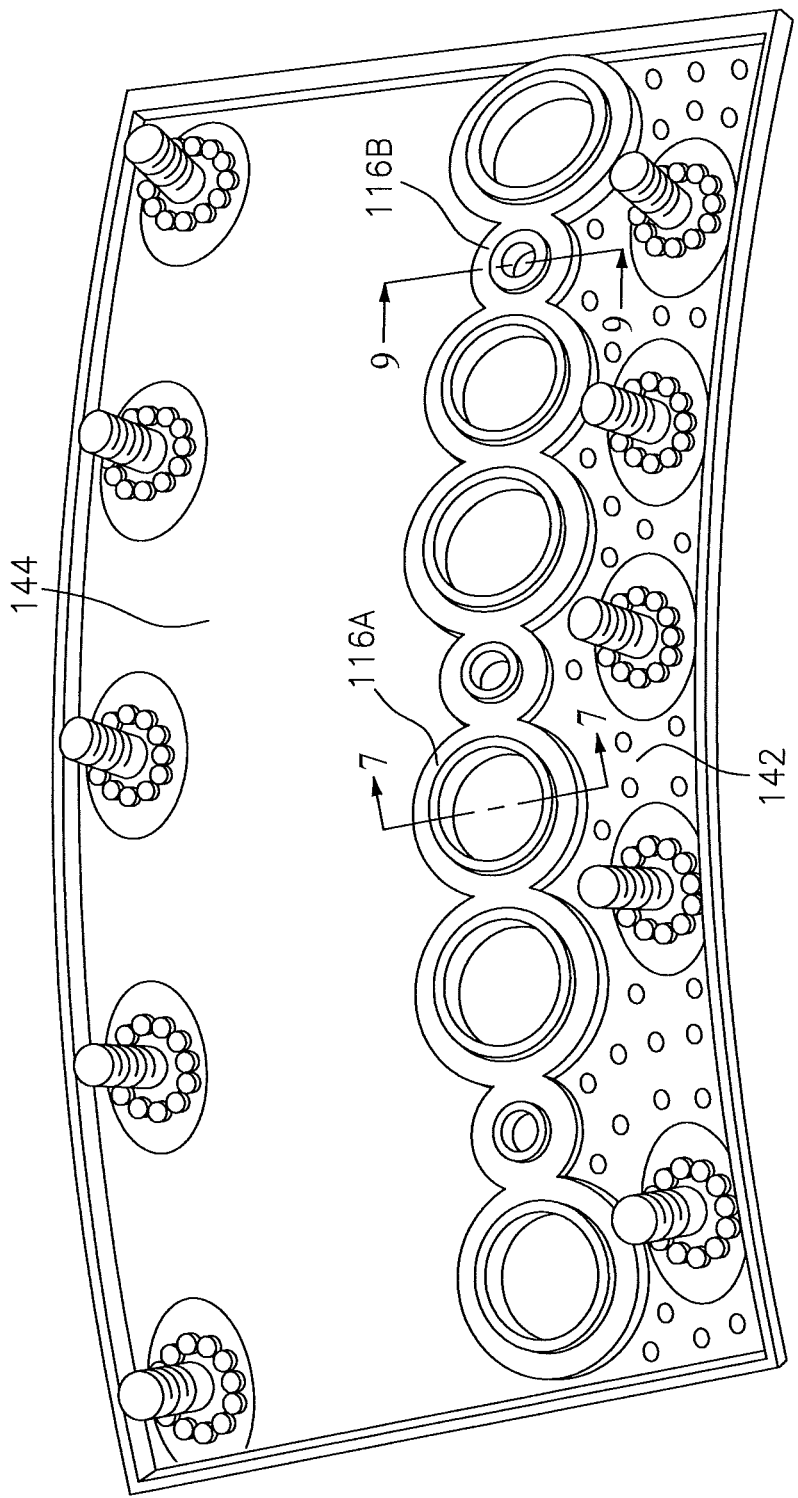
FIG. 6 is a perspective cold side view of a liner panel according to one disclosed non-limiting embodiment.

This dilution air is not primarily used for cooling of the metal surfaces of the combustor shells or panels, but to condition the combustion products within the combustion chamber 66. In this disclosed non-limiting embodiment, the dilution passages 116 include at least one set of circumferentially alternating major dilution passages 116A and minor dilution passages 116B (also shown in FIG. 6). That is, in some circumferentially offset locations, two major dilution passages 116A are separated by one minor dilution passages 116B. Here, every two major dilution passages 116A are separated by one minor dilution passages 116B but may still be considered "circumferentially alternating" as described herein.

In one disclosed non-limiting embodiment, each of the major dilution passages 116A is about 0.5" (12.7 mm) in diameter and the total number of major dilution passages 116A communicates about eighty-five percent (85%) of the dilution airflow. The minor dilution passages 116B are each about 0.2" (5.1 mm) in diameter and the total number of minor dilution passages 116B communicates about fifteen percent (15%) of the dilution airflow. It should be appreciated that the dilution passages 116a, 116B need not be circular.

Figure 7:
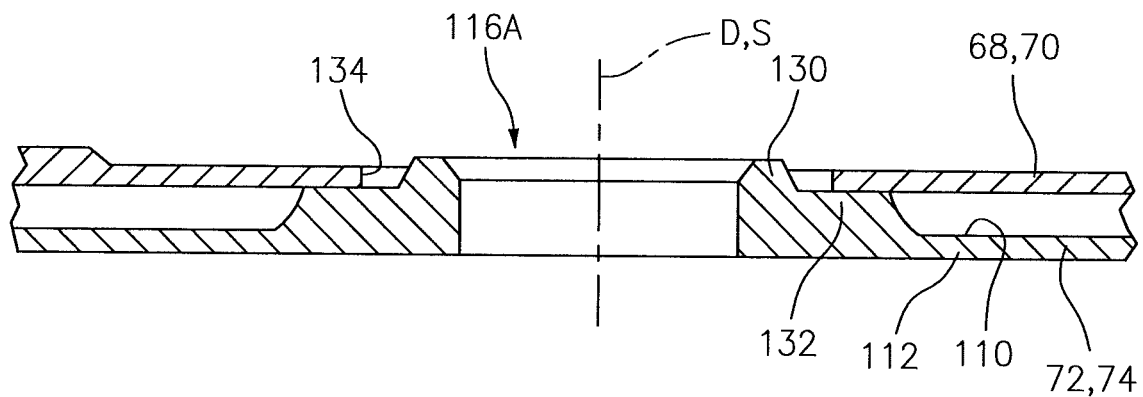
FIG. 7 is a side sectional view thru a portion of a major dilution passage along line 7-7 in FIG. 6.

With reference to FIG. 7, each major dilution passage 116A includes a lip 130 that extends above the respective shell 68, 70 when the liner panel 72, 74 is mounted thereto. The lip 130 is surrounded by a seal boss 132 upon which the respective shell 68, 70 is supported and slides in response to thermal excursions and mechanical tolerances. The seal boss 132 generally extends parallel to the cold side 110 and is raised therefrom. An example seal boss with respect to this disclosed non-limiting embodiment defines an inner diameter—just outside the lip 130—of about 0.64" (16.3 mm) and an outer diameter of about 0.7" (17.8 mm).

Figure 8:
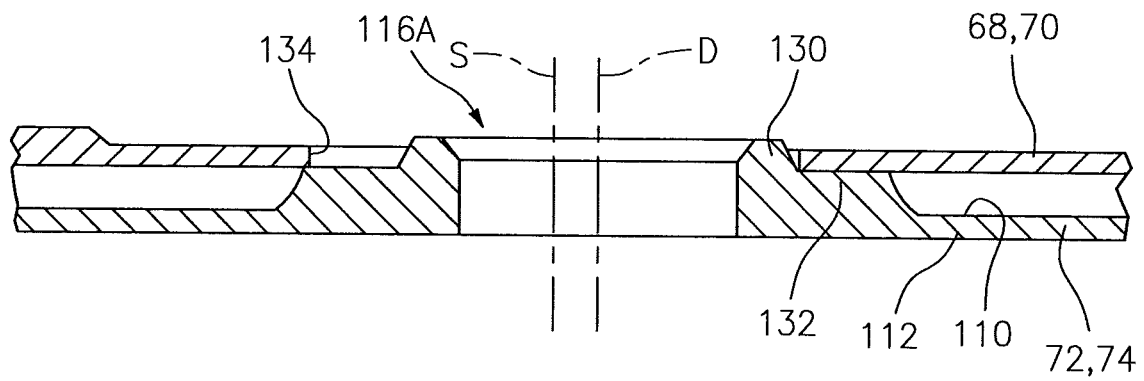
FIG. 8 is a side sectional view thru a portion of a major dilution passage along line 7-7 offset due to an example thermal excursion and/or mechanical tolerance.

A major aperture 134 in the respective shell 68, 70 that corresponds with the dilution passage 116A, defines an axis S that due to, for example, the thermal excursions and mechanical tolerances, may not exactly align with the axis D of the dilution passage 116A (see FIG. 8). Example thermal excursions and mechanical tolerances are of about 0.07" (1.8 mm) in which the inner diameter 136 of the major aperture 134 comes into contact with the lip 130 (see FIG. 8).

Figure 9:
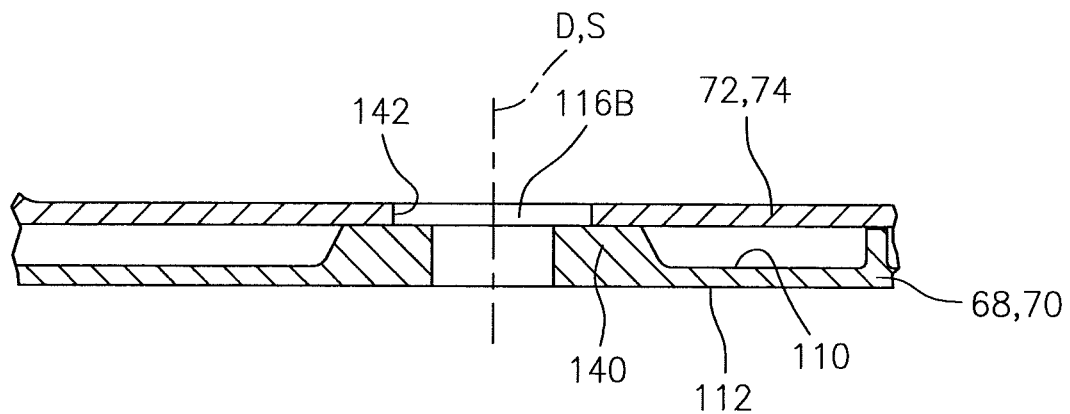
FIG. 9 is a side sectional view thru a portion of a minor dilution passage along line 9-9 in FIG. 6.

With reference to FIG. 9, each minor dilution passages 116B does not include a lip 130 of the major dilution passages 116A and only includes a seal boss 140 upon which the respective shell 68, 70 is supported and slides in response to thermal excursions and mechanical tolerances. The seal boss 140 generally extends parallel to the cold side 110 and raised therefrom. The seal boss 140 may flow together with the circumferentially adjacent seal boss 132 (see FIG. 6). That is, the bosses 140, 132 may be connected together. An example seal boss with respect to this disclosed non-limiting embodiment defines an inner diameter of about 0.2" (5.1 mm) and an outer diameter of about 0.27" (6.9 mm). As the seal bosses, 140, 132 flow together, the seal bosses 140, 132 essentially segregate a forward chamber 142 forward of the dilution passages 116A, 116B and an aft chamber 144 aft of the dilution passages 116A, 116B (see FIG. 6).

Figure 10:
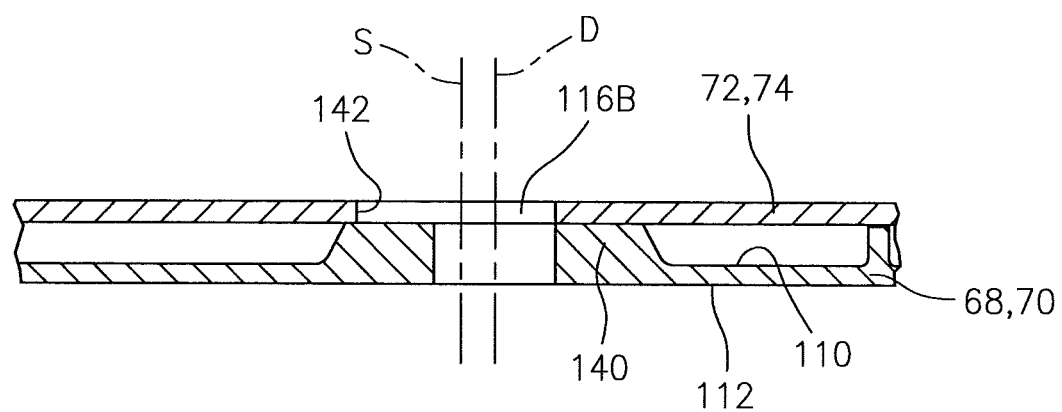
FIG. 10 is a side sectional view thru a portion of a minor dilution passage along line 9-9 offset due to an example thermal excursion and/or mechanical tolerance.

A minor aperture 142 in the respective shell 68, 70 that corresponds with the minor dilution passage 116D, defines an axis S that due to, for example, the thermal excursions and mechanical tolerances, may not exactly align with the axis D of the dilution passage 116B (see FIG. 10). Again, example thermal excursions and mechanical tolerances are of about 0.07" (1.8 mm) may result in a line to line interface on one portion of the minor dilution passage 116B in which a diameter 144 of the minor aperture 142 is aligned with the minor dilution passage 116B (see FIG. 9).

Figure 11:
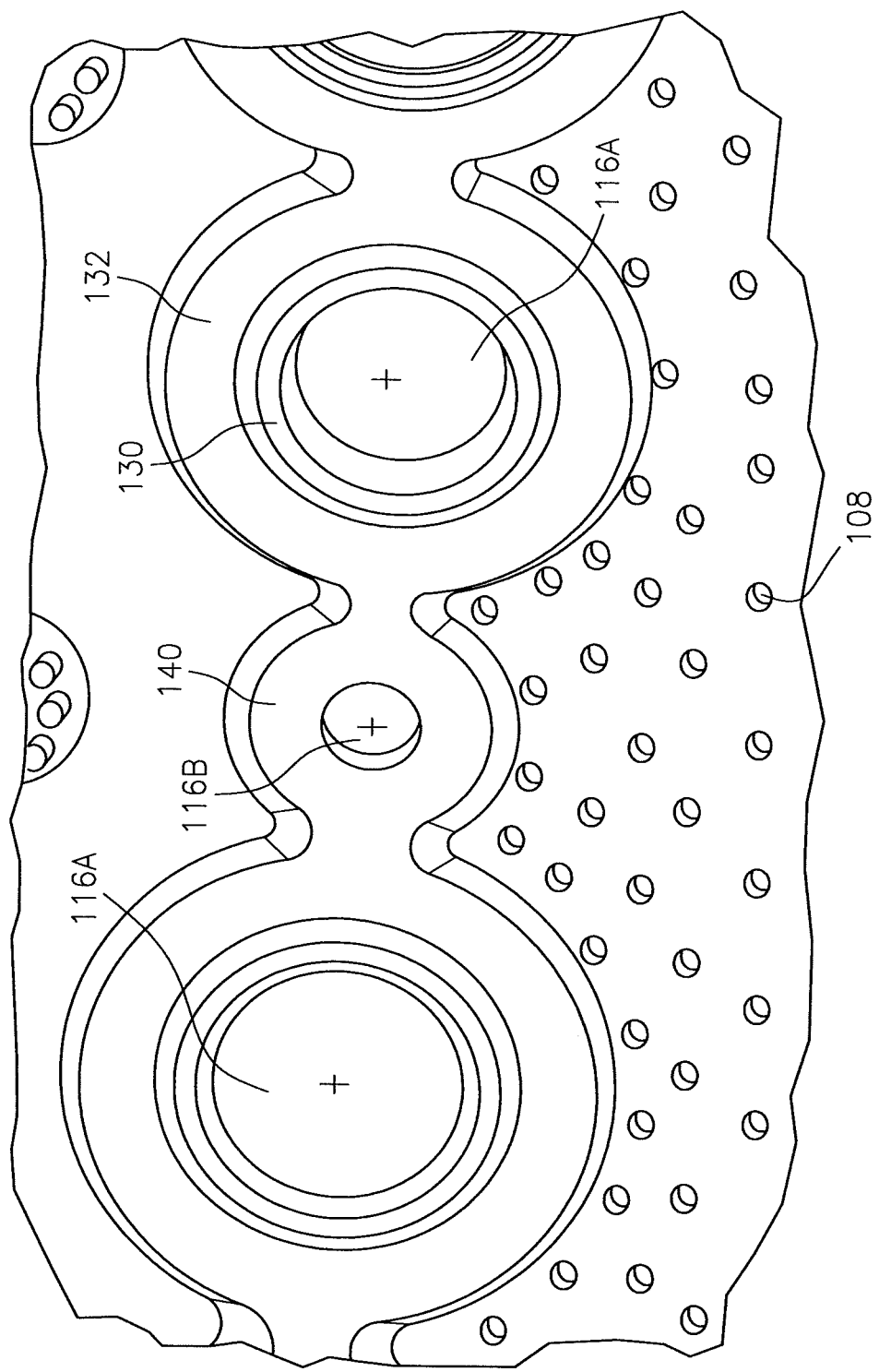
FIG. 11 is an expanded cold side view of the liner panel of FIG. 6 with closely packed effusion passages.

Removal of the lip from the minor dilution passages 116B reduces the potential for buckling of the support shell 68, 70 as well as permits a relatively smaller seal boss 140 on the order of about 56% with only a minimal decrease in dilution airflow passage efficiency. The relatively smaller seal boss 140 facilitate an increased number of effusion passages 108 (see FIG. 11) which may be more closely packed around the circumferentially alternating major dilution passages 116A and minor dilution passages 116B to increased cooling effectiveness thereof. The relatively minimal decrease in dilution airflow passage efficiency thru passages 116B is significantly offset by the increased number of effusion passages 108 which may be more closely packed around the circumferentially alternating major dilution passages 116A and minor dilution passages 116B. That is, the effusion cooling passages can be placed closer to the dilution passages which improves the effusion cooling in that area of the panel.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein; however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A liner panel for use in a combustor of a gas turbine engine, the liner panel comprising:
   a major dilution passage having a lip and a first seal boss; and
   a minor dilution passage having a second seal boss adjacent the first seal boss;
   the first seal boss connected to the second seal boss, and the first seal boss directly contacting the second seal boss in a circumferential direction;
   wherein a connection between the first seal boss and the second seal boss is axially aligned with a center of the major dilution passage and a center of the minor dilution passage along a circumferential line.

2. The liner panel as recited in claim 1, wherein the lip is configured to extend above a support shell when the liner panel is mounted thereto.

3. The liner panel as recited in claim 1, wherein the first seal boss defines an inner diameter outside the lip of about 0.64 inches (16.3 mm).

4. The liner panel as recited in claim 3, wherein the first seal boss defines an outer diameter of about 0.7 inches (17.8 mm).

5. The liner panel as recited in claim 1, wherein the second seal boss defines an inner diameter of about 0.2 inches (5.1 mm).

6. The liner panel as recited in claim 5, wherein the second seal boss defines an outer diameter of about 0.27 inches (6.9 mm).

7. The liner panel as recited in claim 1, wherein the first seal boss and the second seal boss are at least partially surrounded by a multiple of effusion passages.

8. A wall assembly for use in a combustor for a gas turbine engine, the wall assembly comprising:
   a support shell with at least one major aperture and at least one minor aperture; and
   a liner panel mounted to the support shell, the liner panel including a major dilution passage and a minor dilution passage, the major dilution passage having a lip that extends at least partially through the major aperture and a first seal boss that seals around the major aperture, and the minor dilution passage having a second seal boss that seals around the minor aperture;
   the first seal boss directly contacting the second seal boss in a circumferential direction;
   wherein a connection between the first seal boss and the second seal boss is axially aligned with a center of the at least one major aperture and a center of the at least one minor dilution aperture along a circumferential line.

9. The wall assembly as recited in claim 8, wherein the first seal boss defines an inner diameter outside the lip of about 0.64 inches (16.3 mm).

10. The wall assembly as recited in claim 9, wherein the first seal boss defines an outer diameter of about 0.7 inches (17.8 mm).

11. The wall assembly as recited in claim 10, wherein the second seal boss defines an inner diameter of about 0.2 inches (5.1 mm).

12. The wall assembly as recited in claim 11, wherein the second seal boss defines an outer diameter of about 0.27 inches (6.9 mm).

13. The wall assembly as recited in claim 8, wherein the first seal boss and the second seal boss are at least partially surrounded by a multiple of effusion passages.

14. A method of directing airflow through a wall assembly within a combustor of a gas turbine engine, the method comprising:
   at least partially sealing a liner panel to a support shell;
   the liner panel including a major dilution passage and a minor dilution passage;
   the major dilution passage having a lip extending at least partially through a major aperture in the support shell and a first seal boss that seals with the support shell around the major aperture; and
   the minor dilution passage having a second seal boss that seals with the support shell around the minor aperture;
   wherein the first seal boss extends to the second seal boss in a circumferential direction such that the first seal boss directly contacts the second seal boss;
   wherein a connection between the first seal boss and the second seal boss is axially aligned with a center of the major dilution passage and a center of the minor dilution passage along a circumferential line.

15. The method as recited in claim 14, further comprising providing a line to line interface between the minor dilution passage and the minor aperture in the support shell in response to a thermal excursion and mechanical tolerance.

16. The method as recited in claim 14, further comprising at least partially surrounding the first seal boss and the second seal boss by a multiple of effusion passages.

17. The method as recited in claim 14, further comprising integrally forming the major dilution passage and the minor dilution passage with the liner panel.

18. The method as recited in claim 14, further comprising connecting the first seal boss and the second seal boss.

* * * * *